Dec. 17, 1963   S. B. FRIEDLANDER   3,114,151
STRIP STITCHER

Filed May 25, 1961   10 Sheets-Sheet 1

FIG I

INVENTOR.
SAMUEL B. FRIEDLANDER
BY
Oberlin, Maky & Donnelly
ATTORNEYS

Dec. 17, 1963   S. B. FRIEDLANDER   3,114,151
STRIP STITCHER
Filed May 25, 1961   10 Sheets-Sheet 2

FIG 2

INVENTOR.
SAMUEL B. FRIEDLANDER
BY
Oberlin, Maky & Donnelly
ATTORNEYS

Dec. 17, 1963    S. B. FRIEDLANDER    3,114,151
STRIP STITCHER
Filed May 25, 1961    10 Sheets-Sheet 3

FIG 3

INVENTOR.
SAMUEL B. FRIEDLANDER
BY
Oberlin, Maky & Donnelly
ATTORNEYS

Dec. 17, 1963 S. B. FRIEDLANDER 3,114,151
STRIP STITCHER

Filed May 25, 1961 10 Sheets-Sheet 4

INVENTOR.
SAMUEL B. FRIEDLANDER
BY
Oberlin, Maky & Donnelly
ATTORNEYS

Dec. 17, 1963  S. B. FRIEDLANDER  3,114,151
STRIP STITCHER

Filed May 25, 1961  10 Sheets-Sheet 5

INVENTOR.
SAMUEL B. FRIEDLANDER
BY
Oberlin, Maky & Donnelly
ATTORNEYS

INVENTOR.
SAMUEL B. FRIEDLANDER
BY
Oberlin, Maky & Donnelly
ATTORNEYS

INVENTOR.
SAMUEL B. FRIEDLANDER
BY

ATTORNEYS

Dec. 17, 1963   S. B. FRIEDLANDER   3,114,151
STRIP STITCHER
Filed May 25, 1961   10 Sheets-Sheet 8

INVENTOR.
SAMUEL B. FRIEDLANDER
BY
Oberlin, Maky & Donnelly
ATTORNEYS

FIG 22

United States Patent Office 3,114,151
Patented Dec. 17, 1963

3,114,151
STRIP STITCHER
Samuel B. Friedlander, Cleveland Heights, Ohio, assignor to Production Machinery Corporation, Mentor, Ohio, a corporation of Ohio
Filed May 25, 1961, Ser. No. 112,713
24 Claims. (Cl. 1—66)

This invention relates generally, as indicated, to a strip stitcher and more particularly to a machine and method of joining elongated metal strips at the entry end of a continuous strip processing line. The machine of the present invention is especially suited for use in silicon steel annealing lines, continuous annealing and pickling lines, and light gauge ferrous and non-ferrous processing lines of many types.

When, for example, it is desired continuously to anneal silicon steel strips, it becomes a problem to join the trailing end of a metal strip to the leading end of a following length at the entry end of the continuous strip processing line since silicon steel is quite difficult to weld in the usual manner. Conventional stapling or stitching devices have been employed, but these have only been effective to join relatively thin gauge metal and it has heretofore been impossible to join heavier thicknesses of metal by a stitching or stapling process. Moreover, conventional stitches generally protrude slightly from the metal strip causing roll marking in the processing lines. It has long been a problem quickly and properly to join heavier thicknesses of metal strip for subsequent processing.

It is therefore a principal object of the present invention to provide a machine which will quickly and effectively join lengths of metal strip and the like.

It is another main object to provide a machine which will join heavier thicknesses of hard metal, such as silicon steel, by stitching the overlapped strip ends together.

It is still another important object to provide a machine which will automatically place a row of stitches in lapped metal strip.

It is yet another object to provide a machine for joining metal strip which will locally deform the strip to reduce its thickness and then subsequently apply a wire stitch thereto using relatively light gauge wire.

It is still a further object to provide a machine which will lance or deform metal strip prior to stapling or stitching thereof while ensuring that the stitches pass only through such deformed portions.

It is still another object to provide a machine for joining metal strip effective to produce a joint which will not cause appreciable roll marking in a subsequent processing line.

It is still another object to provide a machine for joining metal strip which may be completely automatic in operation.

It is yet a further object to provide a method of joining quickly and economically metal strip at the entry end of a continuous strip processing line or the like.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings.

I. THE MACHINE COMPONENTS AND GENERAL ARRANGEMENT

Figure 1:
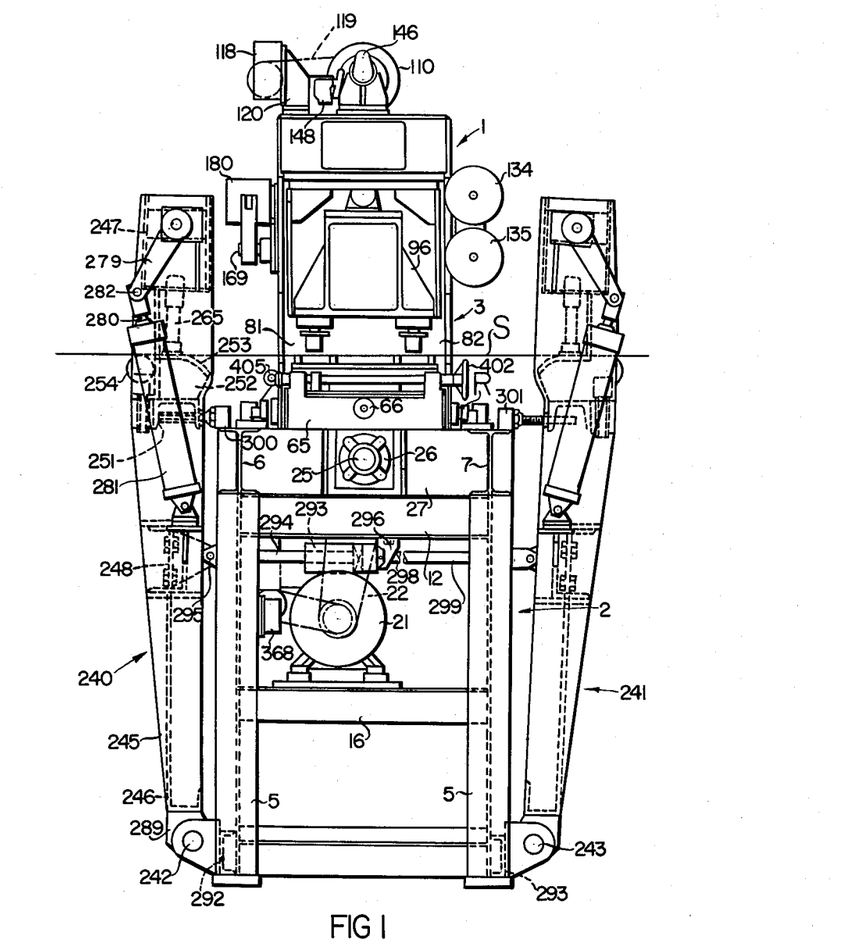
FIG. 1 is an end elevation of the machine in accordance with the present invention.
Figure 2:
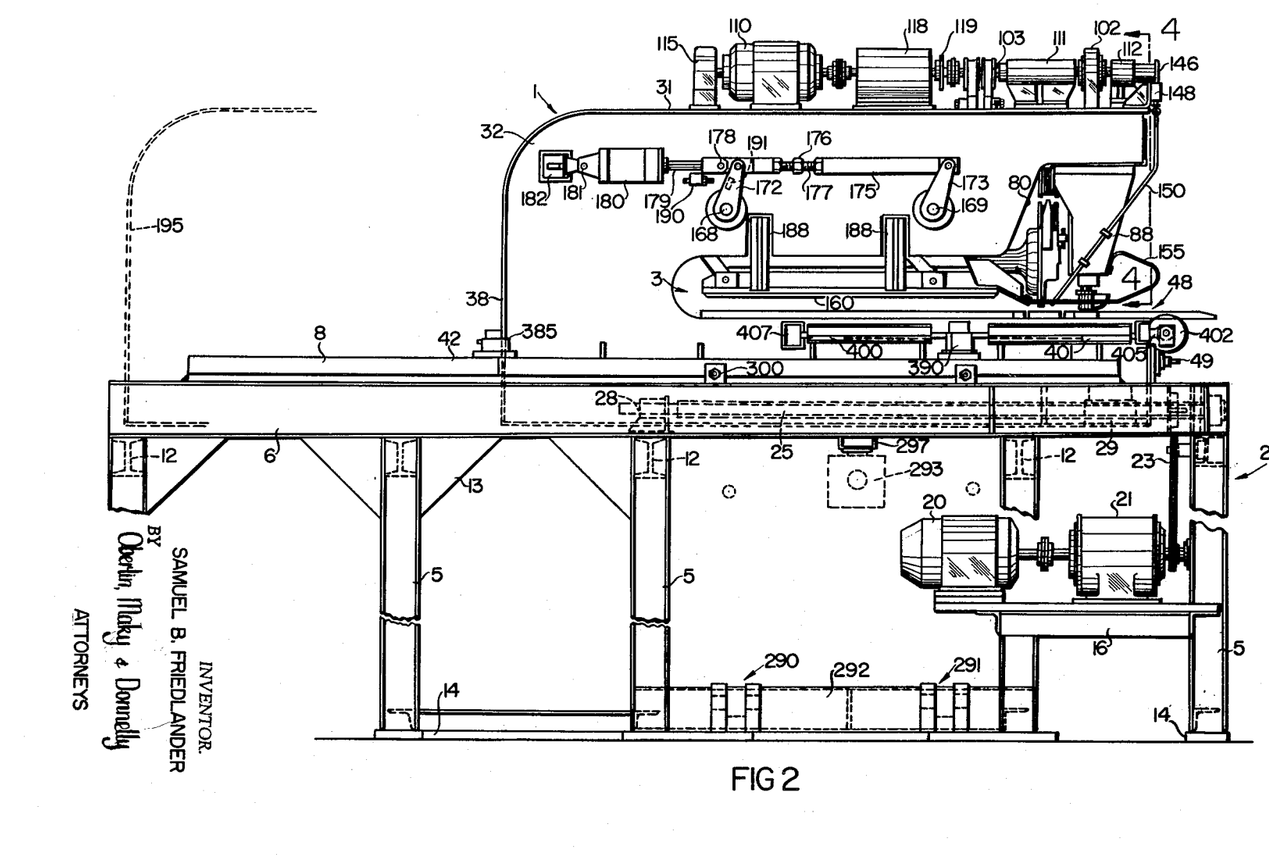
FIG. 2 is a fragmentary side elevation of the machine of FIG. 1 with parts removed for clarity of illustration.
Figure 3:
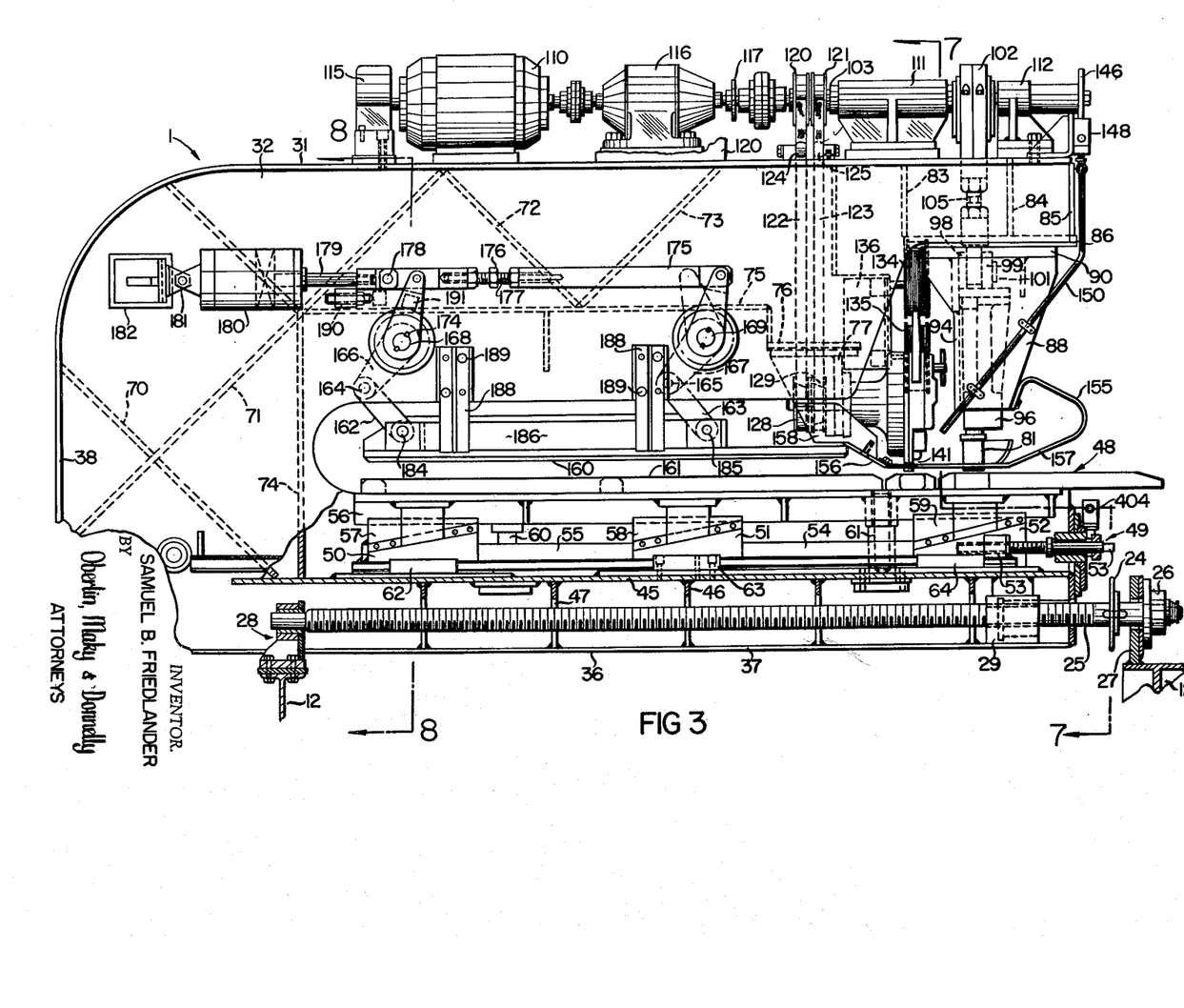
FIG. 3 is an enlarged side elevation partially in section of the stitching head frame and drive therefor.

Referring now to the annexed drawings and first to FIGS. 1, 2 and 3, it will be seen that the preferred embodiment of the invention there illustrated comprises a U-shape frame 1 mounted for movement on a stand 2, such movement of the frame 1 being transversely of the elongated metal strip stock S which extends within the horizontally elongated open portion 3 of the frame 1.

Figure 8:
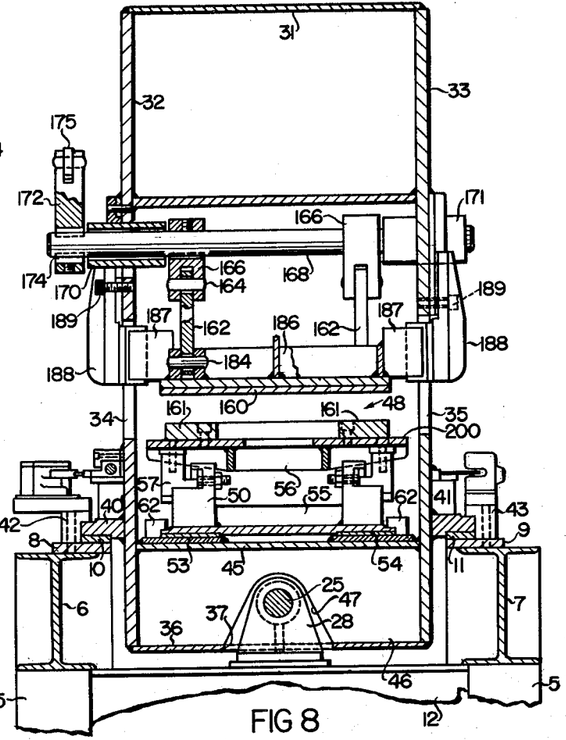
FIG. 8 is a fragmentary vertical section taken substantially on the line 8—8 of FIG. 3 showing the drive mechanism for the stitch flattening or masher assembly.

As seen perhaps more clearly in FIGS. 1, 2 and 8, the stand 2 comprises a series of vertically extending supporting legs 5 which carry two horizontally extending I-beams 6 and 7 (see FIG. 8) on which are mounted rail plates 8 and 9 which are topped by wear plates 10 and 11 serving as guideways for movement of the U-shape frame transversely of the strip. Transverse rigidifying frame members which extend generally parallel to the strip path as shown at 12 serve to rigidify the stand and so it will serve as a firm support for the rail supporting beams 6 and 7. Reinforcing gusset plates 13 also serve to rigidify the stand to provide a firm support for the traversing frame 1. The legs 5 of stand 2 may be supported on bed plates 14 to support the frame 1 so that the pass line for the stock S will be at the desired height to conform to the strip processing mechanism of the processing line, as described.

At one end of the stand beneath the beams 6 and 7, there is supported on a horizontal shelf 16 extending between the legs 5 a frame traverse drive motor 20 and clutch and brake unit 21 which is connected by means of a chain drive 22 through idler sprocket 23 to the sprocket 24 keyed on threaded traverse shaft 25.

As shown more clearly in FIG. 3, the traverse shaft has its one end journalled in bearing 26 mounted on crossplate 27 which may be welded to the initial transverse support beam 12. The opposite end of the traverse shaft 25 is supported in bearing 28 which is in turn mounted directly on a transverse beam 12. The threaded traverse shaft 25 is then supported on the top of the stand directly between the support beams 6 and 7 by means of the transverse beams 12 and is driven for rotation by the motor 20 through the clutch-brake unit 21.

The shaft 25 is connected to the U-shape frame 1 by means of a threaded connection between the threaded portion of the shaft 25 and the nut-like threaded collar portion 29 of the frame 1. In this manner, opposite directional rotation of the shaft 25 will oppositely traverse the frame 1. It will be seen that the stand for the frame 1 is made of heavy structural steel members of either channel or I-sectional shape to provide a rugged heavy welded structural steel base, such base supporting firmly the ways on which the frame traverses.

Figure 7:
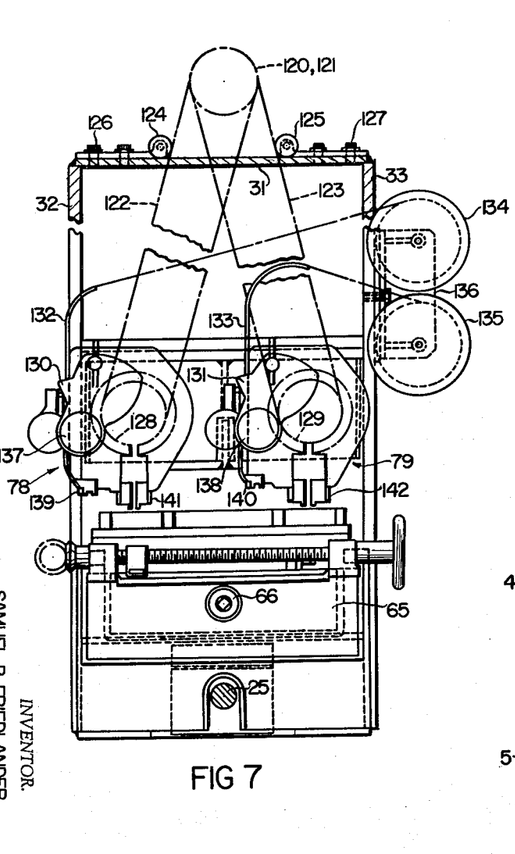
FIG. 7 is a fragmentary vertical section taken substantially on the line 7—7 of FIG. 3 showing details of the stitcher heads.

The frame 1 will for the purposes of the present discussion be called or termed a generally U-shape frame although the term C-shape may equally well be employed. The frame 1 serves as a means to support the punch and stitch heads of the present invention as well as the die plates which cooperate therewith to join lengths of steel strip. Like stand 2, frame 1 is of heavy welded steel construction and as seen in perhaps more detail in FIGS. 3, 7 and 8, such frame comprises a top plate 31 and two side plates 32 and 33 joined together by fillet welds shown more clearly in FIGS. 7 and 8. Each of the side plates 32 and 33 are provided with openings 34 and 35 which form the opening 3 through which the strip S passes. A bottom plate 36 provided with a center longitudinal slot 37 closes the frame 1 to provide a rigid welded plate box-type construction.

As seen in FIGS. 2 and 3, the top plate 31 curves down to form the back-plate 38 which joins the slotted bottom plate 36. The slot in the bottom plate, of course, accommodates the mountings for the feed screw 25.

Figure 8A:
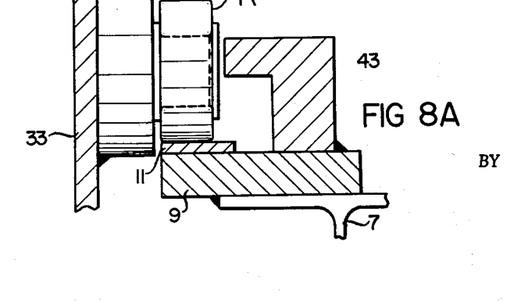
FIG. 8A is a detail view of one manner in which the traversing frame may be supported for movement.

Welded to each of the side plates 32 and 33 below the openings 34 and 35 respectively are frame supporting slide flanges or rails 40 and 41 which may ride on the wear plates 10 and 11, and gibs 42 and 43 mounted on the plates 8 and 9 overlie the flanges 40 and 41 so that the frame may be supported on the wear plates or ways for sliding movement tranversely of the strip S passing through the openings 34 and 35. Rollers R as seen in FIGS. 1 and 8A may be used with or in place of such slide flanges.

The bottom leg of the U-shape frame 1 is provided with a horizontally extending support plate 45 welded to the sides and supported above the bottom plate 36 by a series of reinforcing plates 46. Such plates 46 are provided with U-shape cutout openings 47 to clear the traverse screw 25 and the bearings therefor. The shelf 45 within the lower leg of the U-shape frame serves as a support for the die plate or anvil shown generally at 48 over which the strip passes as it moves through the openings 34 and 35.

In order to adjust the die plate or anvil for different thicknesses of material, a convenient adjusting screw mechanism is provided as shown at 49. This mechanism accomplishes vertical movement of the die plate 48 by means of a series of pairs of inclined support blocks 50, 51 and 52 which are mounted for short distance horizontal movement on ways 53 and 54 on the top of shelf 45 (see FIG. 8). The adjusting screw 49 is connected through nut mechanism 53 to the first block 52 and the blocks 52, 51 and 50 are interconnected as shown at 54 and 55. The die plate 48 is supported on a frame 56 which is in turn supported on pairs of inclined supports 57, 58 and 59 which are respectively supported on the horizontally movable inclined supports 50, 51 and 52. Vertical guides 60 and 61 may be employed to guide the frame 56 and thus the die blocks 48 for vertical linear movement, such guides 60 and 61 comprising guide elements in the form of pins mounted on the frame 56 and guided in guiding portions or receptacles mounted in the lower leg of the U-shape frame. Pairs of gibs 62, 63 and 64 serve to guide the inclined supports 50, 51 and 52. The screw mechanism 49 is mounted on the front plate 65 of the lower leg in bearing 66 (see FIG. 1) so that turning of the screw mechanism 49 by a suitable wrench or other crank mechanism will cause the inclined supports 50, 51 and 52 to move horizontally thus to cause the frame 56 and the die plates 48 mounted thereon to move vertically.

The top leg of the frame 1 may be provided with diagonally extending reinforcing plates between the side walls 32 and 33 as shown at 70, 71, 72 and 73 in FIG. 3. These plates in addition to the vertically extending reinforcing plate 74 tend to reinforce the bight portion of the frame so that the top leg thereof will be firmly horizontally supported over the bottom leg. A horizontal reinforcing shelf or plate 75 is provided with a lower offset portion 76 which joins with a transverse framing member 77 which serves as a support for dual stitcher heads 78 and 79 (see FIG. 7). As seen in FIGS. 2 and 3, the side plates 32 and 33 are cut back as shown at 80 to provide access to the stitcher heads as well as to the punches 81 and 82 shown in more detail in FIG. 4. Transverse framing members 83 and 84 as well as end plate 85 provide the requisite transverse support for the outer ends of the side plates 32 and 33. A horizontally extending plate 86 bridges the lower edges of the side plates to provide a support for the punches and the guide mechanisms therefor.

Figure 4:
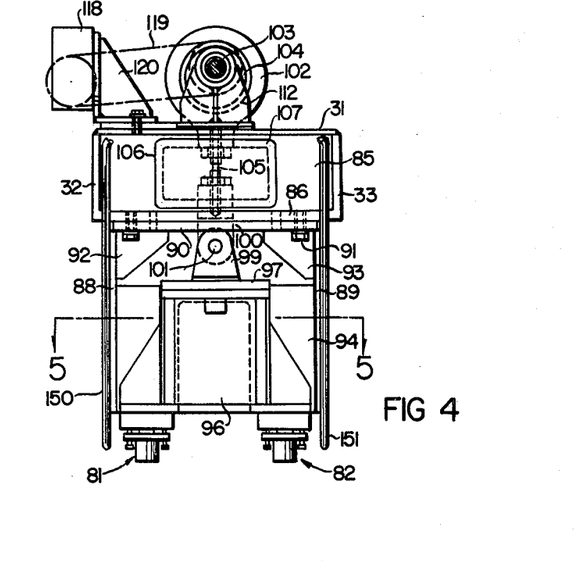
FIG. 4 is a fragmentary vertical section taken substantially on the line 4—4 of FIG. 2 showing the punch drive mechanism of the present invention.
Figure 5:
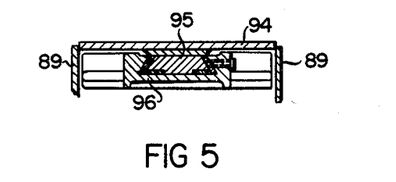
FIG. 5 is a horizontal section taken substantially on the line 5—5 of FIG. 4.

As seen more clearly in FIG. 4, the punch and guide mechanism comprises two side plates 88 and 89 which are welded to a top plate 90 which is in turn bolted to the bottom plate 86 of the frame as shown at 91. Reinforcing webs or gusset plates 92 and 93 serve to rigidify such guide structure. A plate 94 extends between the two side plates and is provided with a dovetail vertically extending guide 95 as seen in FIG. 5 which fits within a dovetail guideway within the punch frame member 96. The top plate 97 of the punch frame 96 is provided with two upstanding ears 98 and 99 (see FIG. 3) so that the punch is connected to the lower end of pitman arm 100 by pin 101. The pitman 102 is driven by the spindle shaft 103 through eccentric 104. The length of the pitman arm 100 is adjustable by means of a turnbuckle 105, access to which may be had through openings 106 in plates 84 and 85. A cover or appearance plate 107 is removably applied to the opening 106 in end plate 85.

As seen in FIGS. 2 and 3, the spindle drive shaft 103 is driven by an electric motor 110 which is mounted directly on the top frame plate 31 as are the spindle bearings 111 and 112. One end of the shaft of motor 110 is connected to an electrical brake 115 and the other end is coupled to a speed reducer unit 116, with the speed reducer being coupled to the spindle shft 103. A sprocket 117 is mounted on the output shaft of the reducer 116 and drives a rotary limit switch mechanism 118 (note FIG. 1) through chain drive 119, such limit switch being mounted on bracket 120 on the top plate 31. The bracket and limit switch are shown broken way in FIG. 3.

Cog belt sheaves 120 and 121 are mounted on the spindle shaft 103 adjacent the bearing 111 with cog belts 122 and 123 trained thereabout. These cog belts drive the stitcher heads 78 and 79, as shown more clearly in FIG. 7, and adjustably mounted idlers 124 and 125 are mounted on the top plate 31 to control the tension in such cog belts. Pairs of clamping screws 126 and 127 may be employed to adjust the position of the idlers thus to control the tension in the belts.

Figure 6:
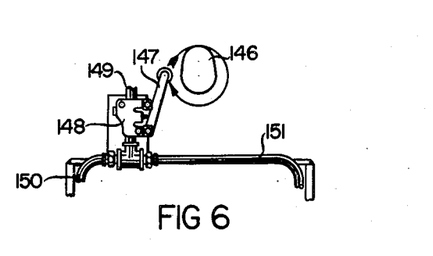
FIG. 6 is a fragmentary end elevation of the drive shaft for the punch and stitcher mechanisms illustrating the air valve operated thereby.

The belts 122 and 123 drive the cog sheaves 128 and 129 on the stitching heads, respectively, which drive the stitching mechanisms. Each such stitching head includes a wire feed mechanism 130 and 131, respectively, which draws wire through wire guides 132 and 133 from wire reels 134 and 135 mounted by means of a bracket 136 on the side plate 33. The wires from the reels 134 and 135 are drawn through by feed mechanisms 137 and 138 to be fed through straighteners 139 and 140 and into the severing and gripper mechanisms 141 and 142, whereby severed lengths of such wire stock will be forced downwardly through lapped lengths of strip stock on the bed 48 to be clinched by clinching dies therebeneath. The stitcher heads of the present invention may, for example, be a "Bostitch" stapling head of the BH series model symbols and preferably model BHM. It will be understood that the heads per se form no part of the present invention. All of the wire feed severing and gripping mechanisms of each of the heads are driven by the belts 122 and 123 thereof and such operation of the stitchers is completely automatic. If the stitcher should improperly form or grip the severed wire segments to form a wire stitch therewith, the stitcher may leave a broken or bent wire segment on top of the work. In order to remove any such debris, the distal end of the spindle shaft 103 is provided with a cam 146 (see FIGS. 3 and 6) which contacts an air valve arm 147 to open air valve 148 once for each revolution of the shaft 103. Air from a suitable source 149 is then supplied through conduits 150 and 151 which are bent and directed (as shown in FIG. 3) to the stitching areas of each of the stitching heads so that any loose metallic fragments will be blown away as the shaft makes one complete revolution.

It can now be seen that the punch is driven by the shaft 103 as are the stitcher heads and thus each will be operated simultaneously first to produce a deformation in the steel strip being joined and then, after the frame has been indexed, to join the steel strip through the deformed portions by operation of the stitcher heads. Also, the cam 146 ensures that an air blast will be supplied through the conduits 150 and 151 to blow any loose metal fragments from the stitcher heads.

Strip guide runners 155 may be employed on each side of the frame, such runners being shaped as shown in FIGS. 2 and 3 and extending from the side plates 88 and 89 to an inclined guide plate 156. The bottom of such runners as well as the bottom edge of the plate 156 are closely spaced above the die plate 48 so that the strip S will fit between such runners and the die plate. The purpose of the runners 155 and the sloping front edge 157 is to guarantee that the strip enters the opening in the traversing frame. The inclination of the plate 156, which is mounted on each side of the frame to side plates 158, ensures that the strip stock S does not hang up on the stitching heads when the frame is moved from right to left as seen in FIGS. 2 and 3. As the frame traverses the strip, moving from left to right in FIGS. 2 and 3, first deforming and then stitching the strip, the punch and stitcher heads will move out beyond the edge of the strip, placing the strip beneath the masher head 160 so that the stitched strip can then be flattened between the plate 160 and the anvil platens 161.

As seen in FIGS. 3 and 8, the masher plate 160 is mounted on two pairs of links 162 and 163 which are pivoted as shown at 164 and 165 to crank arms 166 and 167. As indicated in FIG. 8, the crank arms 166 may be keyed or otherwise secured as by the set screw shown therein to transverse shaft 168 and the crank arms 167 may be similarly secured to transverse shaft 169. Each of the shafts 168 and 169 extend through the side plates 32 and 33 of the upper leg of the frame 1. Such shafts 168 and 169 may be provided with suitable bearings 170 and 171 as shown in FIG. 8. Crank arms 172 and 173 are secured to the projecting ends of the shafts 168 and 169 by means of keys 174 and the ends of such crank arms are interconnected by an adjustable link 175. The length of such link may be adjusted by means of the nut 176 which turns a threaded stud 177 threaded into the opposite ends of link 175. The link 175 is connected as shown at 178 to rod 179 of piston-cylinder assembly 180. The blind end of the piston-cylinder assembly is connected as shown at 181 to bracket 182 which may in turn be bolted or welded directly to the side plate 32 of frame 1.

Figures 21, 23, 24, 25, 26:
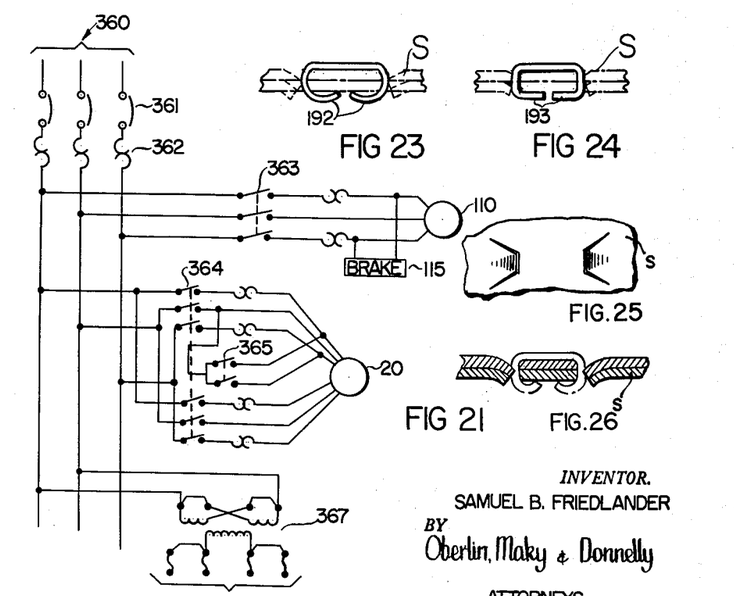
FIG. 21 is a schematic wiring diagram of the electric drive motors of the present invention.
FIGS. 23 and 24 are enlarged diagrammatic views of the staple before and after the mashing operation.
FIGS. 25 and 26 are enlarged diagrammatic top plan and vertical sectional views respectively illustrating the deformed strip.

The links 162 and 163 are pin connected as shown at 184 and 185 to the frame structure 186 which supports the masher plate 160 therebeneath. Mounted on the frame 186 are four vertically extending guide elements 187, which interengage with guiding elements 188 mounted on the exterior of plates 32 and 33 as by screws 189 shown more clearly in FIG. 8. It can now be seen that actuation of the piston-cylinder assembly 180 to move the piston thereof to the left as shown in FIGS. 2 and 3 will rotate crank shafts 168 and 169 in a counterclockwise direction to cause downward movement of the masher frame 186 and thus the masher plate 160. This movement flattens the stitches in the strip stock therebeneath between the plate 160 and the anvil 161. As seen in FIGS. 2 and 3, a stop 190 may be secured to the side plate 32 to engage a projection 191 on the arm 172 to limit the extent of movement of the plate 160 to prevent excessive pressure being applied to the strip. As seen in FIG. 23, the stitching heads leave bowed legs at the bottom of the joint as seen at 192. After the mashing operation these legs will be substantially flattened as seen at 193 so that roll marking will be minimized.

Frame 1 mounts the dual punch heads 81 and 82 thereon as well as the aligned dual stitcher heads 141 and 142, both the punch heads and stitcher heads being driven through the common power source 110. The entire frame is traversed across the strip workpiece by being movably mounted on stand 2 and driven for such traverse by the motor 12 through the clutch and brake mechanism 21 through the feed screw 25. The extent of movement of the frame is shown more clearly in FIG. 2 by the dotted line position at 195, at which position the punch heads 81 and 82 will be adjacent the edge of the strip prior to the punch heads and stitcher heads moving transversely thereacross.

Where as the frame 1 is shown as supported by slide flanges in FIG. 8 on the ways provided by the stand 2, it will readily be understood that the support flanges 40 and 41 may be replaced by or used in conjunction with suitable support rollers R (see FIGS. 1 and 8A) and such support rollers may readily be guided on the ways or rails provided on the top of stand 2 by gibs 42 and 43. In any event, it can now be seen that the frame 1 is driven to traverse the strip extending through the opening 3 therein.

Figure 9:
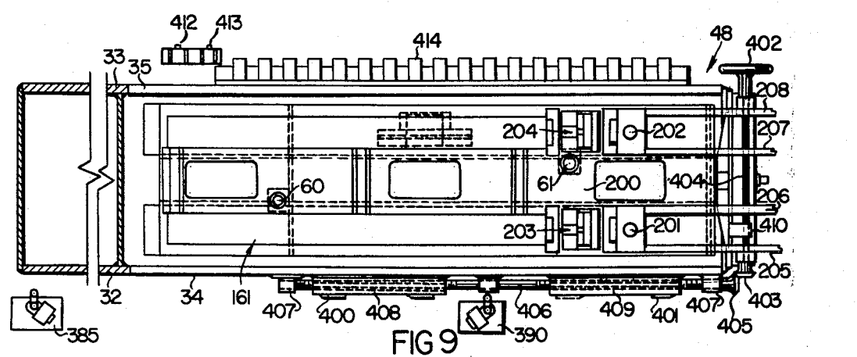
FIG. 9 is a top plan view of the die plate or anvil bed of the present invention.
Figures 10, 12:
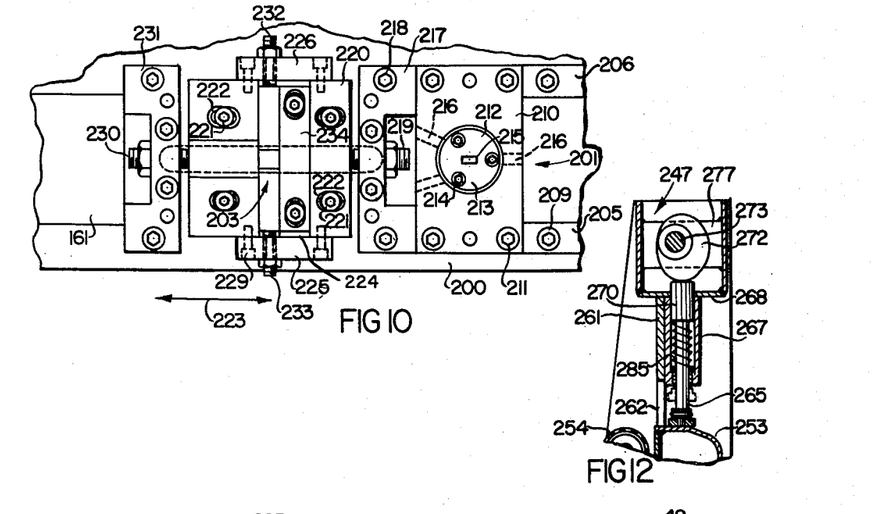
FIG. 10 is an enlarged top plan view of the punch die and stitch clincher.
FIG. 12 is a fragmentary vertical section taken on the line 12—12 of FIG. 13 of the strip clamping mechanism employed with the present invention.
Figure 11:
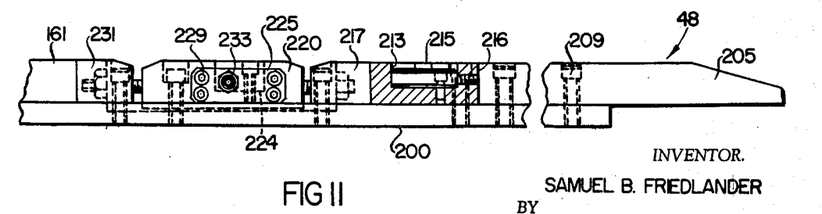
FIG. 11 is a fragmentary elevation partially in section of the die plate of FIG. 10.

Referring now to detail views FIGS. 9, 10 and 11, it will be seen that the die plate structures 48 are mounted within the sides 32 and 33 on the top of the frame 56. Such frame includes a top suporting plate 200 on which are mounted a pair of dies 201 and 202 for the punch heads 81 and 82 and a pair of clincher dies 203 and 204 for the stitching heads 141 and 142. Mounted on the right hand end of the plate 200 as seen in FIGS. 9, 10 and 11, are four strip supporting runners 205, 206, 207 and 208 which overhang the front edge of the plate 200. Also note FIG. 3. These runners or guides may be held to the plate 200 by screws 209 shown more clearly in FIGS. 10 and 11.

Each of the dies 201 and 202 for the respective punch heads is held within a block 210 as shown in FIG. 10 with such block being held to the plate 200 by screws 211. Such die comprises a circular block 212 held within a circular aperture 213 in such block 210. Three screws 214 may be employed firmly to hold the block 212 within the recess or aperture 213. The die block 212 is provided with a rectangular upstanding die projection 215. Three horizontally extending set screws 216 may be employed to engage the sides of the die block 212 properly to position and align the flat sides of the projection 215 with the punch mechanism as well as with the clinching die 203 which, it will be realized, must be aligned with the deformations in the strip stock S produced by the punching head and die in order that the stitching head 141 can properly stitch the deformed strip. Thus, not only must the die projection 215 be aligned with the punching tool positioned thereabove, but it must also be aligned in the direction of travel of the frame with the stitching head 141 and the clinching die 203. The same is, of course, true with regard to the dies 202 and 204 on the opposite side of the die plate 48. The block 210 is held between the runners 205 and 206 and by a U-shape block member 217 which is also held to the plate 200 by screws 218 or the like. Such U-shape block 217 accommodates an adjusting screw 219 which bears against the block 220 of the clinching die assembly 203. Such block 220 is held to the plate 200 by means of screws 221 fitted within slightly elongated slots 222 therein, such slots being elongated in the direction of the force applied by the screw 219 so that the block 220 can be moved in the direction of travel of the frame as seen by the arrow 223 in FIG. 10.

The block 220 is formed with a transversely extending channel 224, the ends of which are closed by side bars 225 and 226 held to the block 220 by screws 229. These side bars provide a mounting for adjusting screws 232 and 233 which bear against the ends of the clincher die 203 to obtain a transverse adjustment thereof. A spacer block 234 within the channel 224 may similarly be adjusted. A U-shape block 231 similar to block 217 is provided with an adjusting screw 230 which cooperates with adjusting screw 219 to provide for adjustment of the clincher die 203 in the direction of the arrow 223. In this manner, the clincher die is adjustable on the die plate 200 in a direction both laterally and longitudinally of the direction of travel 223 so that it can be properly positioned with relation to the punch die projection 215 as well as the stitching head 141 which forces the stitch through the lapped metal sheets to be folded thereunder by the clinching die 203. Elongated die plates 161 which cooperate with the mashing plate 160 abut against the blocks 231 so that as seen in FIG. 11 as the frame moves to the right the strip will ride up the beveled leading edges of the runners 205 to be positioned on top of the die and clincher for the deforming and stitching operation and then moves onto the plates 161 for the stitch flattening operation.

*The Strip Clamps*

Figure 13:
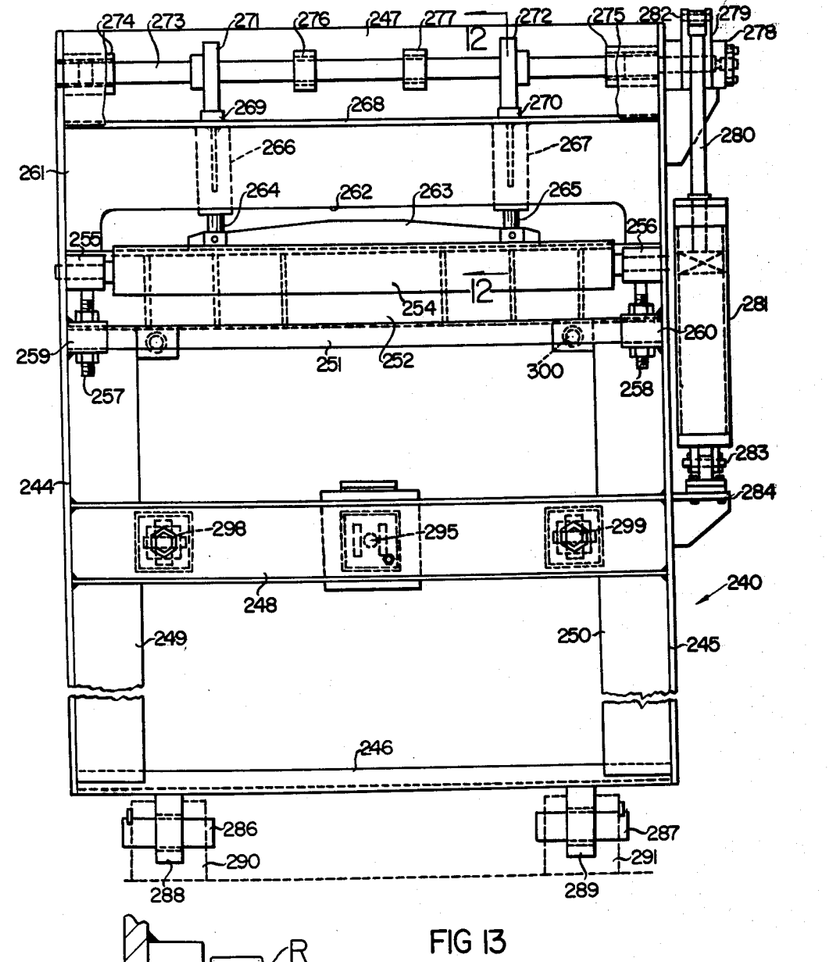
FIG. 13 is a side elevation of a strip clamp.

Referring now to FIGS. 1, 12 and 13, it will be seen that strip clamps 240 and 241 are pivoted to each side of the base of stand 2 as shown at 242 and 243 in FIG. 1. Each of the clamps 240 and 241 is allochirally identical in form and for the purposes of discussion only the frame 240 will be described in detail. Referring now to FIG. 13, it will be seen that the clamp 240 comprises a frame structure which includes side frame members 244 and 245 interconnected at the bottom by a channel frame member 246 and at the top by a rather deep channel member 247. An intermediate transverse channel frame member 248 interconnects the side frame members 244 and 245 and reinforcing webs 249 and 250 extend upwardly along the side frame members 244 and 245 to rigidify the frame structure, these web members terminating at a transverse channel member 251. Supported on the channel member 251 is a shelf structure 252 which has a curved top surface 253 (see FIG. 1). A roller 254 is mounted adjacent the top surface 253 of the shelf structure 252, such roller being mounted in bearings 255 and 256 which are vertically adjustable by means of the adjusting screws 257 and 258 mounted in projections 259 and 260 of the frame members 244 and 245. The rollers of the clamps may preferably be provided with neoprene coverings of 70–75 durometer hardness.

A plate 261 extends between the bottom of the top frame member 247 and the top of the shelf member 252 with such plate having an opening 262 therein. A clamping member 263 therein is pin connected to spring loaded plungers 264 and 265, respectively vertically movably mounted in spring housings 266 and 267 (see FIGS. 12 and 13). The tops 269 and 270 of the plungers are enlarged somewhat and extend through the bottom web 268 of the frame member 247 as shown at 269 and 270, engaging cams 271 and 272 mounted on clamp actuating shaft 273. Such shaft is mounted in bearings 274 and 275 in the ends of the frame member 247 and also in bearings on transverse webs 276 and 277 extending between the walls of the U-shape frame member 247. The clamp operating shaft 273 extends beyond the side frame member 245 into a bracketed bearing 278. A crank arm 279 is keyed to the shaft and connected to the rod 280 of piston-cylinder assembly 281 as shown at 282. The blind end of the cylinder assembly 281 is pivoted at 283 to a bracket 284 extending from the side frame member 245. It can now be seen that extension and retraction of the piston rod 280 of the piston-cylinder assembly 281 will cause oscillation of the shaft 273 which will oscillate the cams 271 and 272 vertically to move the plungers 264 and 265 and thus vertically to move the clamp 263. Springs 285 (see FIG. 12) within the spring housings 266 and 267 will raise the clamp away from the strip S on the shelf 253 as the cam throw is rotated away from the tops 269 and 270 of the plungers.

The pivot 242 for clamp member 240 is provided by pins 286 and 287 which extend through ears 288 and 289 projecting from the bottom of the lowermost frame member 246 and also through the pair of ears 290 and 291 which are mounted on the frame members 292 and 293 at each side of the stand 2. (See FIGS. 1 and 2.)

Pivotal movement of the clamps 240 and 241 about the pivots 242 and 243 is obtained by means of a piston cylinder assembly 293, the rod 294 of which is pivoted to the transverse frame member 248 at 295. The blind end of the piston-cylinder assembly 293 is pivoted to a bracket 296 which is secured to cross channel frame member 297 of the stand 2 (see FIG. 2). In this manner, the stroke of the piston-cylinder assembly 293 will cause pivoting movement of the clamp 240 about the pivot 242. In order that both clamps pivot simultaneously, such clamps are interconnected by connecting rods 298 and 299 which are also pivotally connected to the transverse frame members 248 of each of the clamps 240 and 241. Thus, reciprocation of the piston-cylinder assembly will cause the clamps to oscillate simultaneously about their respective pivots at the base of the stand 2. The extent of oscillation of the clamps can be controlled by adjustable stop screws 300 and 301 mounted on the longitudinally extending I-beam frame members 6 and 7. The position of the clamps is such that when one clamp is adjacent the stand or vertically parallel thereto, as shown by the clamp 240 in FIG. 1, the other will always be slightly pivoted therefrom. The piston-cylinder assembly 293 will then move the strip stock S clamped by each of the clamps a short distance by causing the clamps to pivot simultaneously about their respective pivots 242 and 243.

*The Punch*

Figures 14, 15, 16, 18:
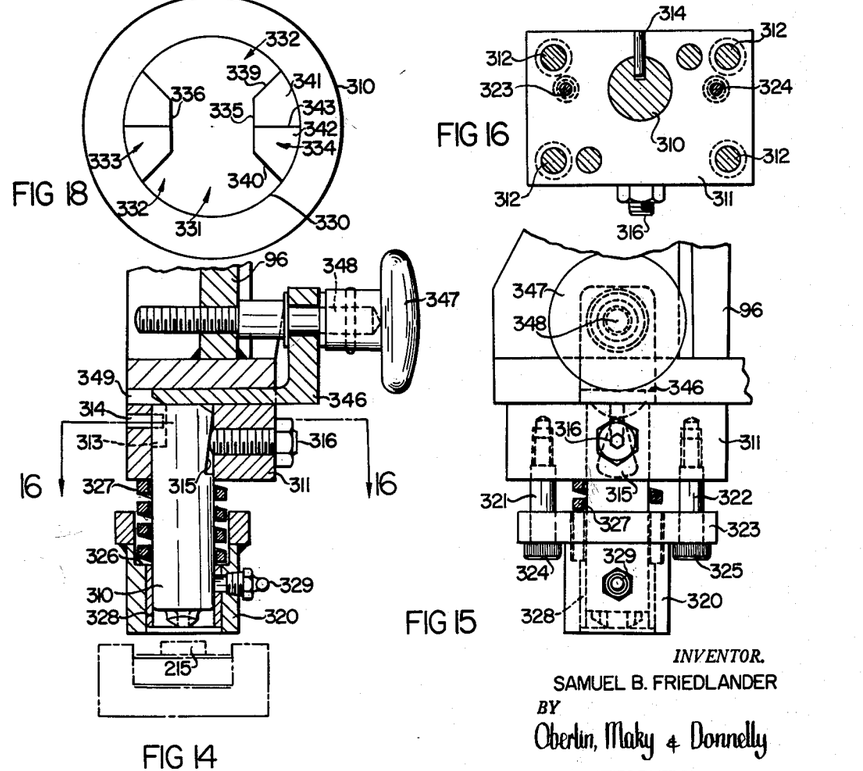
FIG. 14 is a fragmentary detail view of the punch and die mechanism of the present invention with the die shown in section.
FIG. 15 is an end elevation of such punch and die mechanism.
FIG. 16 is a horizontal section taken substantially on the line 16—16 of FIG. 14.
FIG. 18 is an enlarged bottom end view of the punch.

Referring now to FIGS. 14, 15 and 16, there are illustrated the details of one of the punch heads and it can be seen that the punch shank 310 is secured to the punch frame 96 through block 311 secured to the underside of the frame assembly 96 by means of screws 312 or the like. The punch shank 310 is provided with a slot 313 for an orienting pin 314 as well as an inclined flat surface 315 for a locking screw 316. The pressure of the locking screw 316 against the inclined surface 315 will hold the punch shank 310 within the block 311 and the pin 314 within the locating slot 313 will maintain the punch in its proper oriented position.

The lower end of the punch shank 310 is surrounded by a stripper 320 supported on two shoulder screws 321 and 322. Such screws are secured in the block 311 and the stripper 320 is provided with a top flange 323 which engages the respective heads 324 and 325 of the screws 321 and 322 providing a support for the stripper. An interior shoulder 326 in the stripper accommodates a compression spring 327 extending between the stripper and the block 311. A bronze guide sleeve 328 closely surrounds the punch shank and a grease fitting 329 may be provided properly to lubricate the punch shank. It will thus be understood that as the punch frame assembly 96 moves downwardly the lower annular surface of the stripper 320 will contact the strip and move upwardly with respect to the punch shank 310, compressing spring 327. As the punch shank is withdrawn, the pressure of the spring will force the stripper against the stock thus to force the stock away from the cutting edges of the punch. The cutting edges of the punch may, for example, be positioned ⅛ of an inch above the bottom edge of the stripper in the position shown in FIG. 15.

Figure 17:
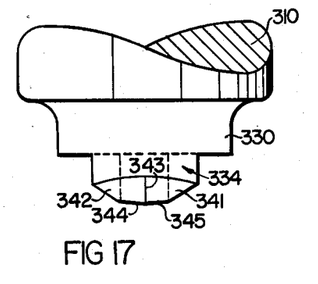
FIG. 17 is an enlarged side elevation of the punch.
Figure 19:
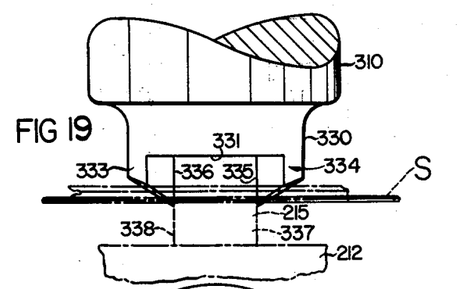
FIG. 19 is an enlarged elevation of the punch with the die and the lapped strip being worked shown schematically.

Referring now to the details of the punch cutting edges as seen more particularly in FIGS. 17, 18 and 19, it will be seen that the punch shank 310 is provided with a reduced diameter end portion 330. A channel 331 extends through the reduced diameter portion 330, such channel being equal to or slightly larger than the width of the die 215. (Note particularly FIG. 19.) The ends of the channel flare outwardly as shown at 331 and 332 producing two cutting teeth 333 and 334. Since the teeth are allochirally identical in form, only the tooth 334 will be described in detail. The exterior surface of the tooth is, of course, cylindrical being a continuation of the reduced diameter surface 330. The interior surface 335 is, of course, parallel to the surface 336 of the tooth 333 as well as parallel to the sides 337 and 338 of the die projection 215. Channel flaring surfaces 339 and 340 join the flat surface 335 with the cylindrical outer surface of the tooth. The bottom surfaces 341 and 342 are inclined and each is at a slight angle to the other joining at the line 343. These surfaces intercept the planar inside flat surface 335 to form the punch cutting edges 344 and 345. As the punch teeth enter the lapped strip stock S, the cutting edges 344 and 345 will tend to shear the strip and the surfaces 341 and 342 will tend to bend the same downwardly adjacent the shear portion deforming the strip. Prior to shearing, the teeth will tend to dimple or deform the strip or otherwise reduce the overall thickness thereof. Since the cutting edges 344 and 345 extend for a substantial distance in the direction of travel of the strip stock, it will be seen that the stitching head need not be perfectly aligned with the center thereof or the edge 343 to make a proper stitch. Thus, if the stitch wire enters anywhere along the deformed or severed portion caused by the edges 344 and 345, the entry of such stitch will be greatly facilitated.

Since it may be difficult to obtain access to the turnbuckle 105 through access plate 107 to disengage the punch when prepunching is not required, there is provided the special back-up key arrangement shown more clearly in FIGS. 14 and 15. By this arrangement the punch shank 310 may be unlocked by loosening the lock screw 316 and the key 346 withdrawn to permit the shank to be recessed further in the block 311. The position of key 346 is controlled by a palm grip type knob 347 which includes a shank 348 passing through an upward extension of the key 346 and threaded into the frame 96. The key fits in keyway 349 and rotation of the knob 347 will move the key to the right as seen in FIG. 14 to permit the shank of the punch to be moved upwardly and locked out of the way. The simple adjustment of the lock screw 316 and the knob 347 is all that is required properly to withdraw the punch from its operative punching position.

*Set-Up and Operation*

Figure 20:
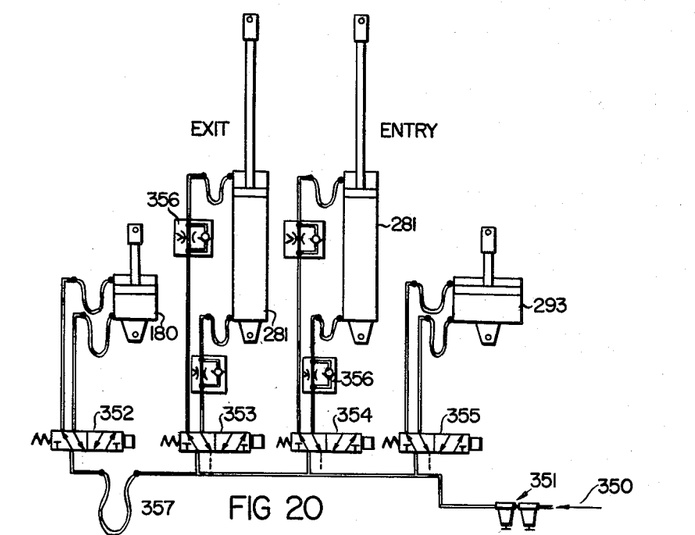
FIG. 20 is a schematic piping diagram showing the fluid motors and their controls in accordance with the present invention.

Referring first to FIG. 20, it will be seen that the piston-cylinder assemblies 180, 293 and the entry and exit clamping cylinders 281 are operated by a pneumatic system with air being supplied from a convenient source 350 through a filter and lubricating system 351 to four four-way, single solenoid operated spring return valves 352, 353, 354 and 355 for the piston-cylinder assemblies 180, 281, 281, and 293. Flow control units 356 may be provided in the fluid lines leading to the blind and rod ends of the cylinders 281 to obtain proper operation of these cylinders. It is noted that the masher operating piston-cylinder assembly 180 is mounted on the frame 1 for movement along the top of stand 2 and accordingly a flexible hose assembly 357 is employed in the line leading to the operating valve 352.

Referring now to FIG. 21, operation of the spindle motor 110, the traverse motor 20, and the various control devices may be obtained from a 220 volt, 3 phase, 60 cycle power supply shown generally at 360 provided with suitable disconnect switches 361 and overload switches 362. The spindle motor 110 may be a 1 H.P. A.C. motor and is controlled by switches 363, the operation of which will hereinafter be described. The traverse motor 20 may, for example, be a 3/1½ H.P. 2 speed A.C. motor operated at slow speed by switches 364 and at retrace or fast speed by switches 365. This motor will produce 3 H.P. during retrace or fast speed operation or 1½ H.P. during slow speed operation. The spindle motor 110 may be provided with the automatic brake unit 115 which will be engaged when the spindle motor is disconnected. Both such motors 110 and 20 may be provided with the conventional overload switches. The transformer 367 connected to the power source 360 provides current for the control of the various functions of the machine as will now be described. It is noted that the spindle motor drives a rotary limit switch 118 and also that the traverse motor drives a rotary limit switch 368 (see FIG. 1).

Figure 22:
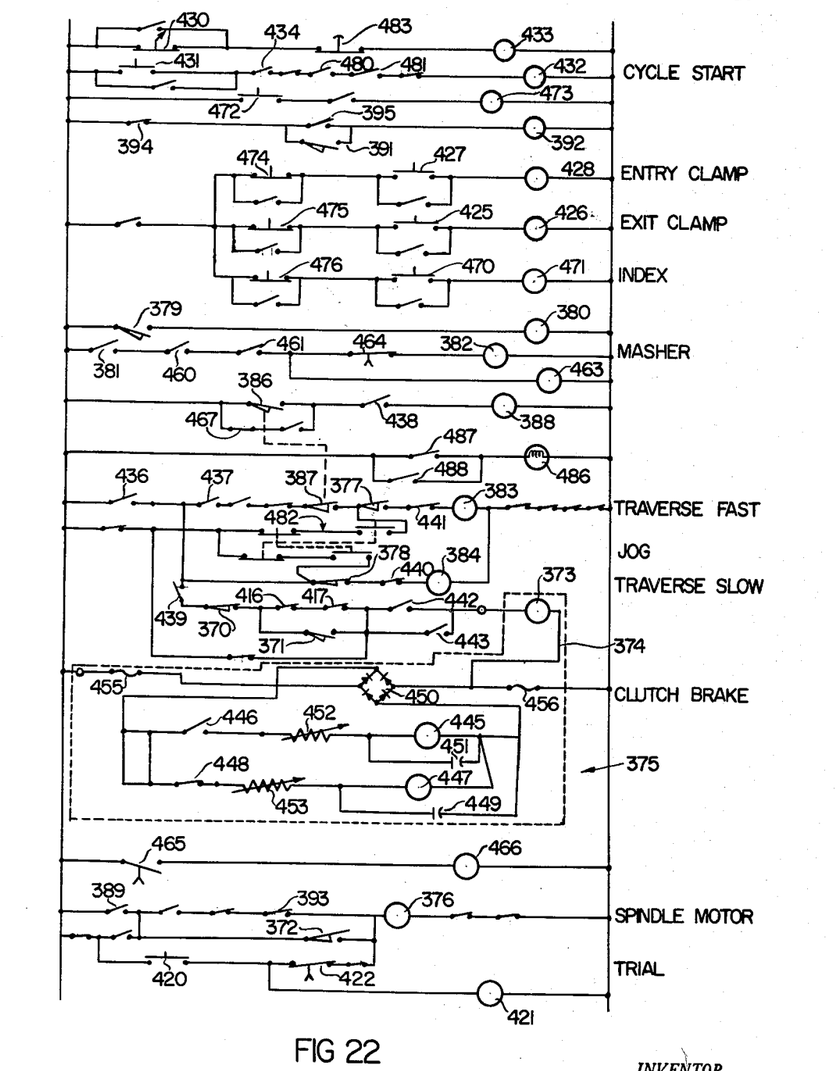
FIG. 22 is a schematic wiring diagram of the circuits through which automatic operation of the machine may be obtained.

Referring now to FIG. 22, the rotary cam limit switch 118 located on the top of the frame and driven by the spindle motor 110 has four contacts, only three of which need be employed with the present machine. Contacts 370 open at 80° and closes at 280° and the closing of such contacts starts the traverse "auto" position. Contact 371 opens at 140° and closes at 220° and is closed to allow the traverse to start in "auto" position. This contact closes in the stitcher "rest" position to permit jogging of the traverse mechanism. This switch also opens to permit the "Vol" which is to stop the traverse for automatic indexing as will hereinafter be described. The third set of contacts of this limit switch 372 open at 80° and close at 280°. The opening of these contacts stops the stitcher at the top of its stroke. The contacts 370 and 371 then control the relay 373 which operates, through line 374, the brake and clutch control mechanism shown generally at 375. Shown below the brake control and clutch mechanism, the spindle motor relay 376 is controlled by the rotary limit switch contacts 372 inter alia.

The rotary cam limit switch 368 located on the lower machine structure driven by the traverse motor 20 has four sets of contacts, again, only three of which may be utilized with the present invention. Contacts 377 are normally closed and open to stop the traverse at its extreme outer limits. Contacts 378 are normally closed and open to stop the traverse at its extreme inner limit. Contacts 379 are normally open and close to reset the "auto" portion of the cycle and to actuate the masher. Thus contacts 379 actuate the outer strip limit stop 380 which in turn closes switch 381 to energize relay 382 to actuate valve 352 thus to actuate masher piston-cylinder assembly 180. Contacts 377 control the relay 383 which closes contacts 365 (see FIG. 21) to operate the traverse motor retrace or at fast speed. Contacts 378 close to control the relay 384 which closes contacts 364 (FIG. 21) to operate the traverse motor at stitch or slow speed.

Referring now to FIG. 9 in addition to the wiring diagram in FIG. 22, a limit switch 385 located on the exit side of the machine has two sets of contacts 386 and 387 with the normally closed contacts 387 opening to stop traverse at the outer strip edge and normally open contacts 386 closing to start the stitcher motor at the outer strip edge. Closing of the contacts 386 energizes relay 388 which in turn closes switch 389, inter alia, to energize the spindle motor 110 through the relay 376.

Aligned with the limit switch 385 in the direction of travel of the frame, there is provided also on the exit side of the machine, a limit switch 390. (Not FIG. 9.) This switch has normally open contacts 391 which close to stop the stitcher motor at the inner strip edge. This switch controls a relay 392 which has normally closed contacts 393 which open to control motor control relay 376 which then opens switches 363 to deenergize the spindle motor 110. Relay 380 also actuates normally closed switch contacts 394 and the relay 392 itself closes holding contacts 395.

Referring again to FIG. 9, it can be seen that the limit switches 385 and 390 are actuated by trips 400 and 401 respectively which are mounted on the side plate 32 of the frame 1 and are adjustable longitudinally of the frame by means of the hand wheel 402. This hand wheel turns a bevel gear 403 on shaft 404 which engages bevel gear 405 on shaft 406. Such shaft is mounted in bearings 407 on the side plate 32. The limit switch trips 400 and 401 are held by guides 408 and 409 and the threaded portions of the shaft 406 move the trips longitudinally of the frame. A pointer 410 threadedly mounted on the shaft 404 cooperates with a scale adjacent thereto to indicate the setting for strip width. Thus it will be seen that the hand wheel 402 provides a scale and pointer adjustment for strip width variation and such is conveniently located for rapid changes by the operator.

Also as seen in FIG. 9, "Vol" switches 412 and 413 are mounted on the entry side of the stand and are actuated by a steel comb 414 mounted on the side of the frame for movement therewith. These switches have contacts 416 and 417 in series with each other which are in the control circuit for the relay 373 which controls the traverse motor fast speed brake and clutch mechanism 375. These switches stop the traverse at the proper index point so that the frame will be stationary and properly positioned when the punch and stitcher operate simultaneously on the strip.

In setting up the machine for operation, the length of the wire stitch and the setting of the stitcher heads should be checked. The stitcher heads should be adjusted to approach the clincher plate within approximately 85% of the total thickness of the material to be stitched. This may be checked by rotating the cam of the rotary limit switch 118 180° and depressing the trial switch push button 420 (see the bottom of FIG. 22). This energizes relay 376 to bring the stitcher heads to rest at the bottom of the stroke by means of deenergization of trial switch timer 421 which opens switch 422 at the required interval. With the stitcher heads at the bottom of the stroke, the setting may be checked by means of a feeler gauge. The clincher plate, of course, can be raised or lowered by means of the wrench adjusted screw 49 (see FIG. 3), but this setting is critical only for the heavier gauges of material. Also the penetration of the punch can be checked by placing samples of the materials to be stitched in position under both punches and depressing the trial switch push button. However, the rotary limit switch must have been returned to its initial setting. The depth of penetration of the punch can, of course, be changed by adjusting the length of the pitman through the turnbuckle 105.

The machine is adjusted to the width of the strip to be stitched by means of the hand wheel 402 with the aid of scale and indicator mechanism 410. The setting should be for approximately 2 inches greater than the width of the strip to be stitched as, for example, for 26 inch strip, the machine should be set for approximately 28 inches. The machine is now ready to commence operation.

The trailing edge of one strip is locked within the confines of the stitch machine exit clamp and it will be noted that the stopping of the strip can be accomplished by conventional looping mechanisms to enable a continuous process to be continued uninterrupted by such stitching operation. With the tail end of the outgoing strip in the machine the operator depresses the exit clamp push button 425 (see FIG. 22) which energizes valve 353 (FIG. 20) to cause the piston-cylinder 281 to extend, firmly clamping the trailing end of the strip within the exit clamp 240. The leading edge of the next strip is fed into the machine through the entry clamp until it laps the preceding strip end. When the strip ends are properly lapped within the opening of the frame 1, the operator will depress entry clamp push button 427 energizing relay 428 causing valve 354 to extend piston-cylinder assembly 281. It is noted that the strips need not be overlapped within the clamp jaws in that the connecting rods 298 and 299 lock the clamps in position relative to each other and thus lock the lapped ends of the strips in the same relative positions.

The initial position of the frame 1 will be in its full forward position as seen in FIG. 2 adjacent the inner edge of the strip. In order to start the cycle, with the selector switch 430 in automatic position, the operator depresses the cycle start switch 431 which energizes cycle start relay 432. The selector switch 430 energizes relay 433 which closes switch 434 enabling the cycle start switch to energize the cycle start relay 432. Cycle start relay 432 closes switch 436 to enable energization of the selected relay 383 or 384 controlling the traverse motor. Such relay also closes switch 437 to cause the frame 1 to traverse at high speed to a position just beyond the outer edge of the strip. At the outer limit, trip 400 will contact limit switch 385 to open contacts 387 to deenergize the retrace relay 383 to stop the traverse motor at its outer limit. It is noted that the rotary limit switch contact 377 will only be opened at the extreme outer limit of the path of travel of the frame. Limit switch 385 also now closes contacts 386 to energize relay 388 which energizes motor 110 to start the stitcher and punch drive which now runs continuously. The relay 433 of the "auto" circuit has closed switch contacts 438 to enable the relay 388 to be energized in response to the tripping of limit switch 385. Cycle start relay 432 also closes switch contacts 439 to energize the traverse motor fast speed brake and clutch control 373. Operation of the clutch and brake mechanism 21 is then controlled through the rotary limit switches 370 and 371. Also, the "Vol" switch contacts 416 and 417 operated by the vane 414 will control the stop and start of the traverse through the clutch brake control 375. Relay 383 actuates normally closed contacts 440 and relay 384 actuates normally closed contacts 441. Also relay 383 actuates normally open contacts 442 and relay 384 actuates normally open contacts 443. Traverse motor relay 384 will now be energized to energize motor 20 to start the traverse of the frame at slow speed with the aforesaid switch contacts 370, 371, 416 and 417 controlling the intermittent motion of the frame through the control 375.

The unit 375 is employed to guarantee the accuracy of the intermittent travel of the frame. A clutch relay 445 is controlled by switch 446 and similarly a brake relay 447 is controlled by switch 448, both switches 446 and 448 being controlled by the relay 373. Thus when the frame is moving and it is to be stopped, a charge will be built up in the capacitor 449 by the rectifier 450 and when switch 448 is closed, the capacitor will immediately discharge into the coil of relay 447 which will lock the frame in place by means of the brake. Similarly the capacitor 451 energizes the clutch control 445 and variable resistors 452 and 453 may be used properly to control the amount of direct current discharged by the capacitors which is obtained from the rectifier 450. Fuses 455 and 456 may also be provided in the circuit.

With the punch and stitch drive now operating continuously, the traversing motor including the brake and clutch mechanism will cause the frame to move intermittently laterally or transversely of the strip held within the opening in the frame by the strip clamps. The arrangement is such that the frame will traverse forward a preset amount during the period of time when the punch and stitch heads are in position to permit this traverse motion. Initially, only the lancing or punch heads will be on the strip so that the first operation occurring will be the production of a double lance in the sheet material partially piercing the double thickness of strip.

It will be noted that the punch may be adjusted by means of the turnbuckle 105 to pierce both or only one of the lapped strips. In this manner, the top strip only may be pierced.

The frame will index forward one-half the distance between the punch and stitch heads so that two lance operations will be made before the stitch head actually will be in position over the previously punched or deformed portions of the strip. At this point, two events occur simultaneously: the stitching head feeds two stitches through the previously punched portions of the strip automatically clinching the stitch in the clincher die 203; and the punching head continues to make a piercing or deforming operation in the next position. The controls are arranged so that the frame will be traversed only during the period when the punch and stitch heads are clear of the work and this intermittent cycling continues across the strip with the punch head making a piercing operation and the stitch head feeding a wire stitch into the previously pierced portions of the strip. This continues completely across the strip until the frame is at its outermost position. The indexing of the frame takes place in approximately 230° of spindle drive rotation and this relationship between spindle drive rotation and the indexing is accomplished by the rotary limit switch contacts 370 and 371.

As the stitcher moves beyond the end of the strip edge, the trip 401 hits limit switch 390 to close switch contacts 391 energizing stitcher stop relay 392. This opens contacts 393 to deenergize the stitcher motor relay 376 thus to bring the stitcher motor to a stop. The brake 115 will bring the shaft 103 to an instantaneous stop.

The frame, however, continues to traverse until the rotary limit switch contacts 378 are opened, deenergizing the slow speed traverse motor relay 384 and bringing the frame to a stop. At this point, the contacts 460 and 461 will be closed in addition to the contacts 381 to energize the masher relay 382 to operate valve 352 to operate the masher cylinder 180. A timer 463 times out to open contacts 464 to deenergize relay 382 and the valve 352 then causes extension of the masher cylinder 180 to raise the masher plate 160. The masher timer 463 also closes switch contacts 465 to energize clutch timer 466 which in turn opens switch contacts 467 in parallel with the contacts 386 controlling the spindle start relay 388. Switch contacts 381, of course, are controlled by relay 380 actuated through rotary limit switch 379 and this relay 380 also signals the end of the complete cycle.

The machine has now completely moved through a cycle to apply a double row of stitches transversely of the strip. At the option of the operator, to apply a second double row of stitches, the strip may be indexed without releasing the clamps by depressing the strip index push button 470. This energizes relay 471 controlling solenoid valve 355 in turn controlling the indexing cylinder 293. The operator then initiates the stitching cycle by depressing the stitch cycle start push button and the machine repeats the stitching cycle. The operator can then depress the stitch cycle release push button 472 energizing the end of cycle relay 473. The entry and exit clamps can now be released through push buttons 474 and 475 and push button 476 will cause the clamps to index to their original position. All such switches are provided with conventional holding circuits. The machine is now in the line run condition and the selector switch 430 should be returned to the manual position.

It is noted that normally opened switches 480 and 481 render the stitch cycle start relay 432 inoperative until the entry and exit clamps are closed. Also, the jog push buttons 482 as well as the trial stitch push button 420 are inoperative except when the selector switch is in the manual or "hand" position. If the emergency stop push button 483 is employed, the machine must be jog returned to the inner or normal rest position before the cycle start relay 432 can be utilized again. Each of the push buttons controlling the "entry," "exit" and "index" relays 428, 426 and 471 respectively are provided with conventional holding circuits. It will also be understood that various other relay interlocks can be provided to ensure the desired operation of the machine.

A traverse run indicating light 486 may be controlled by parallel switches 487 and 488 respectively which are operated by the relays 384 and 383 respectively to indicate when the traverse motor is in operation. Thus, closing of either switch 487 or 488 will energize the lamp 486.

It can now be seen that there has been provided a strip stitcher which will quickly and readily join relatively thick silicon steel strip or the like by first lancing, punching or deforming the strip, then stitching such strip through the deformed portions thereof, and then flattening the stitches to preclude the possibility of excessive roll marking in a continuous line. The stitcher heads and punch heads are aligned in the direction of movement of the frame to ensure that the stitch will be placed through the strip at the deformed portions thereof.

Other modes of applying the principle of the invention may be employed, change being made as regards the details described, provided the features stated in any of the following claims, or the equivalent of such, be employed.

I, therefore, particularly point out and distinctly claim as my invention:

1. The method of joining the leading end of strip stock to the trailing end of strip stock in continuous strip stock processing comprising the steps of lapping such leading and trailing ends, deforming such lapped ends to reduce the thickness thereof in a transversely extending row of pairs of spaced regions, and stapling such ends together through such pairs of thus reduced thickness regions.

2. The method of claim 1 including the step of mashing the thus fastened lapped ends to flatten the staples therein.

3. The method of joining the leading end of strip stock to the trailing end of strip stock in continuous strip stock processing comprising the steps of lapping such ends, clamping together and firmly supporting such lapped ends, deforming such lapped ends to reduce the thickness thereof in a row of pairs of spaced regions, stitching such ends together through such reduced thickness regions thereof, and mashing the thus fastened lapped ends to flatten the stitches therein.

4. The method of claim 3 including the step of indexing such clamping means to move such strip longitudinally firmly to support a next adjacent region of such lapped ends, and then repeating such deforming and stitching steps to join such lapped ends in at least two rows of stitches.

5. A strip stitcher for elongated strip stock comprising a punch and die adapted to deform such strip materials to produce pairs of closely spaced deformations therein, a stitcher adapted to stitch such strip material through each such thus produced pairs of deformations, and means to move such punch and die and said stitcher in alignment transversely of such elongated strip first to deform and then stitch such strip.

6. A strip stitcher as set forth in claim 5 wherein said punch and stitcher operate intermittently, such intermittent operation being a function of the distance between said punch and said stitcher whereby said stitcher is adapted to stitch through one such deformation while said punch and die make a next preceding deformation.

7. A strip stitcher comprising a U-shaped frame adapted to enclose elongated strip stock, means for moving said frame transversely of such stock, one leg of said frame comprising an anvil bed and the other leg of said frame comprising stitching means cooperating with said anvil bed for joining lapped ends of such stock within said frame, said other leg including punch means aligned transversely of such stock with said stitching means for first deforming such strip to produce pairs of closely spaced deformations to facilitate the stitching of such strip through such pairs of deformations.

8. A strip stitcher as set forth in claim 7 including means to operate said punch and stitching means intermittently, such intermittent operation of said punch and stitching means being a function of the distance therebetween whereby only deformed portions of such strip will be stitched.

9. A strip stitcher as set forth in claim 7 including drive means for said punch and stitcher, said drive means including a power driven shaft, and means to drive said punch and stitcher from said shaft.

10. In a strip stitcher, the combination of a U-shaped frame adapted to enclose elongated strip stock, means mounting said frame for movement transversely of such strip, one leg of said frame including stitcher means and the other leg of said frame including anvil means, said anvil means including means to clinch the stitches produced by said stitcher means, and said one leg including a stitch masher adapted to flatten the stitches produced by said stitcher against said anvil means.

11. The combination set forth in claim 10 including drive means for moving said frame transversely of such strip and means operative to drive said stitcher in response to the position of said stitcher in relation to the edges of such strip.

12. The combination set forth in claim 10 including clamp means for such strip on each side of said U-shaped frame and means to move both said clamp means in unison to index such strip longitudinally through said frame.

13. A strip stitcher comprising a stand, a U-shaped frame adapted to enclose elongated strip stock, said frame being mounted on said stand for movement transversely of such stock, frame drive means for thus moving said frame; clamp means on each side of said frame pivoted to said stand and each including power actuated strip clamping jaws, means interconnecting said pivoted clamp means to move said clamp means in unison longitudinally to index such strip through said U-shaped frame; one leg of said U-shaped frame including an anvil adapted to underlie such strip, the other leg of said U-shaped frame including a strip stitcher, drive means on said other leg to operate said stitcher, said anvil cooperating with said stitcher to clinch stitches produced thereby, and stitch masher means mounted on said other leg adapted to flatten the thus produced stitches against said anvil.

14. A strip stitcher as set forth in claim 13 including strip deforming means mounted on said other leg driven in unison with said stitcher means, and die means mounted in said anvil adapted to cooperate with said strip deforming means to facilitate stitching of such strip, said strip deforming means comprising a punch driven by said stitch drive means through a pitman, and means responsive to the distance between said strip deforming means and said stitcher to actuate said stitcher and strip deforming means simultaneously to stitch only portions of such strip deformed by said strip deforming means.

15. In a stitcher for joining metal strips and the like, a frame, a stitching head on said frame, a spindle operative to drive said stitching head, and means responsive to the rotative position of said spindle operative intermittently to index said frame across such strip to produce a row of stitches therein.

16. A stitcher as set forth in claim 15 including a punch driven by said spindle, said punch being spaced from said stitching head in the direction of travel of said frame, and means responsive to the spacing of said punch and stitching head to control the extent of such intermittent movement of said frame.

17. A strip stitcher comprising a U-shape frame adapted to enclose elongated strip stock, means for moving said frame transversely of such stock, one leg of said frame comprising an anvil bed and the other leg of said frame comprising stitching means cooperating with said anvil bed for joining lapped ends of such stock within said frame, said other leg including punch means for first deforming such strip to facilitate the stitching thereof, and said other leg including mashing means for flattening stitches in such strip against said anvil bed.

18. A strip stitcher comprising a U-shape frame adapted to enclose elongated strip stock, means for moving said frame transversely of such stock, one leg of said frame comprising an anvil bed and the other leg of said frame comprising stitching means cooperating with said anvil bed for joining lapped ends of such stock within said frame, said other leg including punch means for first deforming such strip to facilitate the stitching thereof, said other leg also including mashing means for flattening stitches in such strip against said anvil bed, and means to operate said masher after the means to move said U-shape frame transversely of such strip material has moved said stitcher beyond the edge of such strip.

19. In a stitcher for joining metal strips and the like, a frame, a stitcher and punch on said frame, a continuously rotating spindle operative to drive said stitcher and punch, and means responsive to the rotative position of said spindle when said stitcher and punch are clear of such strip intermittently to index said frame across such strip to produce a row of stitches therein.

20. A strip stitcher comprising a U-shape frame adapted to enclose elongated strip stock, means for moving said frame transversely of such stock, one leg of said frame comprising an anvil bed and the other leg of said frame comprising stitching means cooperating with said anvil bed for joining lapped ends of such stock within said frame, said other leg including punch means aligned transversely of such stock with said stitching means for first deforming such strip to facilitate the stitching thereof, drive means for said punch and stitcher, said drive means including a power driven shaft, means to drive said punch and stitcher from said shaft, and means to actuate and stop said drive means in response to the position of said stitcher with respect to the edges of such strip.

21. A strip stitcher comprising a U-shape frame adapted to enclose elongated strip stock, means for moving said frame transversely of such stock, one leg of said frame comprising an anvil bed and the other leg of said frame comprising stitching means cooperating with said anvil bed for joining lapped ends of such stock within said frame, said other leg including punch means aligned transversely of such stock with said stitching means for first deforming such strip to facilitate the stitching thereof, clamp means for such strip stock, and index means to move said clamp means and thus to move such stock longitudinally through said frame.

22. A strip stitcher as set forth in claim 21 wherein said clamp means includes power actuated clamps on both sides of said frame, and said index means includes means to move said clamps in unison.

23. In a stitcher for joining metal strips and the like, a frame, a stitching head on said frame, a spindle operative to drive said stitching head, means responsive to the rotative position of said spindle operative intermittently to index said frame across such strip to produce a row of stitches therein, and a stitch masher operative to flatten the thus formed stitches upon completion of such intermittent frame movement.

24. In a strip stitcher, a frame, stitching means on said frame, means operative to traverse said frame and thus said stitching means across such strip to place a transverse row of stitches therein, clamp means on each side of said frame for such strip, and index means operative to move each said clamp means in unison to move such strip longitudinally through said frame whereby said frame can again be traversed across such strip to place another tranverse row of stitches therein without unclamping such strip.

References Cited in the file of this patent

UNITED STATES PATENTS

| | | |
|---|---|---|
| 1,016,120 | Ainsworth | Jan. 30, 1912 |
| 1,469,261 | Havener | Oct. 2, 1923 |
| 2,619,855 | Williams | Dec. 2, 1952 |
| 2,814,803 | Northup | Dec. 3, 1957 |